FIG.1.

United States Patent Office 3,186,917
Patented June 1, 1965

3,186,917
PROCESS AND APPARATUS FOR DIALYSIS
FERMENTATION
Philipp Gerhardt, Ann Arbor, and De Vere M. Gallup, Southfield, Mich., assignors to Biochemical Processes, Inc., New York, N.Y., a corporation of New York
Filed Apr. 18, 1962, Ser. No. 188,416
8 Claims. (Cl. 195—1)

This invention relates to a process of fermentation, to the apparatus for carrying out such process, and to test apparatus for determining suitability of apparatus for use in practicing the process. More particularly, this invention relates to a process and apparatus for increasing the efficiency and effectiveness of fermentations by liquid-suspension cultures of microorganisms in systems that provide for the dialysis of diffusible nutrients and products across dialyzers which separate the fermentor from the nutrient supply.

"Fermentation" is used in the broad sense to include the culturing, cultivation and production of the cells and cell components of microorganisms in pure and mixed cultures, the alteration and conversion of nutrients and other materials upon which cells grow and act, and the formation of products intracellularly and extracellularly, under aerobic, anaerobic or intermediate conditions. "Microorganisms" includes the usual spectrum of microscopic life, such as viruses, rickettsiae, bacteria, yeasts, molds, algae, protozoa, and the like, as well as free-living suspensions of higher plant, animal and human cells, and enzymes and enzyme systems derived from cells and capable of cell-free catalysis. "Cultures" is used in the broad sense to include not only suspensions of growing cells of microorganisms but also non-growing cells and enzymes.

Industrial fermentations by microorganisms commonly are carried out as batch operations in a single container of nutrient solution. A culture of microorganisms is introduced and allowed to grow or act upon the nutrient under controlled environmental conditions, the cells and non-volatile products of growth accumulating in the container. Fermentation ceases when the supply of required nutrient becomes depleted or imbalanced or when accumulating products become toxic. Total cell yield and cell population density obtainable from cells multiplying in a given container is limited, it being difficult and inconvenient to control both the supply of nutrients and the withdrawal of toxic products in order to increase the concentration of microorganisms and the yield. There is no method known in the art for increasing the concentration of cells or other non-diffusible materials after the primary period of fermentation, which concentration may be carried out in the same vessel in which the fermentation is accomplished.

In the techniques used today where the fermentor is initially charged with a batch of nutrient solution, it is necessary that all of the solution, the vessels holding solution, the air supply and connecting conduits be sterile. Sterilization in commercial industrial processes requires large amounts of energy. For instance, heat energy is required to raise the diluent and vessels to sterilization temperatures. In some fermentations commonly practiced, the microorganism is cultured in a nutrient medium containing large molecules or particles as enrichment materials. The presence of these complex materials complicates the recovery of cells or products. By known methods it is not possible to remove these complicating materials from the immediate growth environment of the cells and yet retain their beneficial effects.

It is sometimes desired to associate different organisms for the mutual benefits which the organisms derive from such association or symbiosis. By known methods it is not possible to establish separate environments for each of the groups in order to have them reach maximum yields and concentrations, and still maintain the interchange necessary to symbiosis.

The known processes of dialysis fermentation consist essentially of growing liquid cultures of microorganisms in a confined environment with provision for diffusion of nutrients and products across a semi-permeable membrane to an adjacent reservoir of nutrient solution. Some known dialysis methods grow microorganisms as solid cultures on the membrane surface. The known methods of dialysis fermentation are not readily expandable to large scale operations, are not readily controlled, and are limited in the types of membranes employable.

The cellophane sac technique is the most frequently cited among known processes for dialysis fermentation of microorganisms and consists of immersing in a nutrient solution a sac made from a semi-permeable membrane, such as cellophane, the sac containing a liquid culture. Some variations on the sac technique flow a nutrient medium past a cellophane tube filled with a culture. The cellophane sac technique is limited in scale of operation, control, and membrane applicability.

Accordingly, it is an object of this invention to provide a process and apparatus for dialysis fermentation which are capable of expansion to any scale of operation without limitations due to the process and which result in increased cell population or fermentation product densities during the fermentation period.

It is also an object of this invention to provide a process and apparatus for dialysis fermentation so as to enable separate control of the fermentation, nutrient reservoir, and dialysis, and to permit sorting and concentrating fermentation products both during and after the fermentation period, and to permit employing various types of membranes.

It is still another object of this invention to provide a continuous fermentation process and apparatus to enable effective replacement of spent nutrients, or addition of nutrients in amounts greater than those commonly assimilable in order to further enhance concentration and yields.

It is yet another object of this invention to provide a process and apparatus to supply air, oxygen or other gases indirectly to a culture without concomitant agitation or foaming of the culture, and to enable the use of such gases without sterilization.

It is a further object of this invention to provide a process and apparatus to enable the separate propagation of commonly symbiotic organisms, while maintaining the interchange necessary to symbiosis.

Other objects will be apparent to those skilled in the art from reading the following description taken in conjunction with the drawings in which.

The objects of this invention are accomplished by carrying out fermentation of microorganisms in a fermentor region remote from a nutrient supply region, and transferring nutrients to the fermentor region and products from the fermentor region by means of a dialyzer remote from both the fermentor and nutrient supply regions. The fermentor region comprises a fermentor vessel, or other suitable container for the fermenting culture, and means to circulate the fermenting culture from the fermentor through the dialyzer and back to the fermentor. The nutrient supply region comprises a vessel, or other suitable container, for the aqueous nutrient, and means to circulate the nutrient from the supply vessel through the dialyzer and back to the supply vessel.

The dialyzer comprises one or more sheets, tubes or other forms of semi-permeable membrane supported in such a way that the fermenting culture contacts one side of the semi-permeable membrane while the nutrient contacts the other side. The dialyzer functions to exchange diffusible materials, such as crystalloids and the like, through the semi-permeable membrane and to retain non-diffusible materials, such as colloids, macromolecules, cells, and the like, on the desired side of the semi-permeable membrane, the exchange and retention depending on the relative permeability of the semi-permeable membrane.

"Semi-permeable membranes," when used herein, includes any material suitable for carrying out dialysis and includes "membranes" and "ultra-filters." "Membranes," as used herein, identifies semi-permeable membranes having a relatively fine porosity, for example about 3 millimicron mean pore diameter. "Ultra-filters," as used herein, identifies semi-permeable membranes having a relatively coarse porosity, for example, about 300 millimicron mean pore diameter.

The dialyzer may assume a variety of designs to accomplish its function. A preferred embodiment of the dialyzer is one that resembles a plate-and-frame filter press and comprises a series of alternate culture and nutrient chambers connected in parallel and separated by semi-permeable membranes.

We have found that microorganisms and their macromolecular fermentation products may be concentrated during growth by propagation in a confined environment with allowance for diffusional access across a remote semi-permeable membrane to a remote supply of nutrient. Densities about three or more times as great as in non-dialysis fermentation may be obtained often without sacrificing total yield. Cell densities greater than $1 \times 10^{12}$ viable cells per milliliter have been attained in dialysis fermentation tests with *Serratia marcescens* strain 8UK, as compared with a maximum of $2 \times 10^{11}$ reported using non-dialysis methods. With the same microorganisms a packed cell volume of 50% has been achieved, as distinguished from the usual 1 to 5% obtainable by other processes. Packed cell volume is determined by centrifuging the culture and measuring the solid volume as a portion of total volume of solid and liquid.

Other advantages of dialysis growth include the use of a simpler growth environment due to separation of non-diffusible components. For example, a sensitive organism, such as *Hemophilus influenzae* can be grown in a simple water extract of the usual complex cooked-blood medium, and a dense growth can be harvested easily and clean for the preparation of vaccines. The result is contrary to the usual sparser growth in a much more complex medium.

A preferred embodiment of our invention comprises a one stage dialysis fermentation system having the nutrient supply vessel, the dialyzer and the fermentor remote from each other, being connected by appropriate conduits and the like. By separating the three principal regions, nutrient supply, fermentation and dialysis, the rate of reaction of the fermenting culture may be separately and efficiently controlled. Control may be accomplished by varying the circulation rates of the nutrient and the culture through the dialyzer, by varying the ratio of nutrient volume to culture volume, and also by varying the physical size of the dialyzer, that is, by varying the area of semi-permeable membrane available for dialysis. Control may also be accomplished by regulation of the environment differently in one region than another; for example, the temperature of fermentation may be held optimum for the culture while the temperature of the nutrient supply may be held low to retard possible contamination. In this way, only the fermentor and the dialyzer need be sterilized, the nutrient supply being preserved by refrigeration and the few microorganisms in the nutrient supply being withheld from the fermentation by the semi-permeable membrane.

By separating the individual members of the three principal regions, production may be varied in scale in order to create a production capacity without limitation due to the process of fermentation. That is, the vessels used for fermentation and nutrient supply may be as large as desired and of any design; they need not be positioned adjacently, provided only, that they can be connected with conduits to a dialyzer. Similarly the dialyzer can be made as large as desired, without limitation due to the process of fermentation. In the preferred dialyzer embodiment that resembles a plate-and-frame filter press, increased capacity is attained simply by adding more chambers; if length of the dialyzer becomes excessive, another unit can be used in parallel.

Furthermore by separating the individual members of the three principal regions, different types of semi-permeable membranes may be employed. As a result, dialysis fermentation can be conducted using sheet membranes that are not fabricated in sacs or tubes, very fragile membranes, or ultra-filters. Combinations of membranes and ultra-filters may be used at the same time in one dialyzer, so as to permit sorting of molecules and cells according to size.

Figure 1:
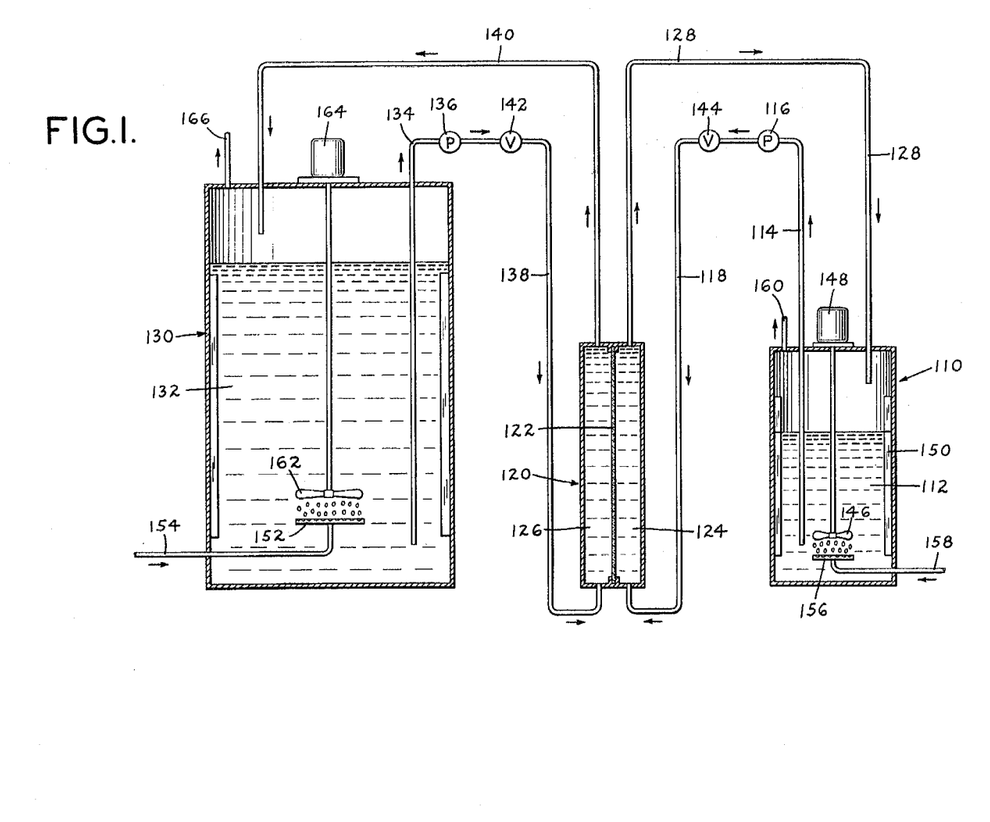
FIGURE 1 is a schematic view of a one-stage dialysis fermentation system having a fermentor, nutrient supply and dialyzer remote from each other.

In FIGURE 1, there is shown a preferred embodiment of the present invention. FIGURE 1 shows a fermentor, a dialyzer, and a nutrient supply vessel, each remote from the other and connected for the circulation of fluids by conduits and pumps. The fermentor 110, containing a culture 112, may be constructed of any well-known material suitable for the fermentation of microorganisms. Conduit 114 extends below the level of the culture in the fermentor and is connected to the suction side of pump 116. Conduit 118 connects the discharge of the pump 116 with the inlet of one chamber 124 of the dialyzer 120. The dialyzer 120 is divided by membrane 122 into chambers 124, through which the culture flows, and 126, through which the nutrient flows. Conduit 128 connects the outlet of chamber 124 to the fermentor 110. The conduit 128 preferably extends into the fermentor 110 above the level of the culture but may be arranged to extend below the level of the culture. Thus, a circulation system for the culture exists such that the culture may be continuously circulated from the fermentor, through one side of the dialyzer and back into the fermentor.

Nutrient supply vessel 130 contains nutrient 132 which may be water, an aqueous solution, nutrient, medium, or the like. Nutrient 132 is removed from nutrient supply vessel 130 through conduit 134 which extends below the surface of the nutrient and is connected to the suction side of pump 136. Conduit 138 extends from the discharge side of pump 136 to the inlet side of dialyzer chamber 126. Conduit 140 connects the outlet of dialyzer chamber 126 with nutrient supply vessel 130 and preferably extends into nutrient supply vessel 130 above the level of the nutrient 132. If desired, the conduit may be extended below the level of nutrient. Thus, the nutrient continuously circulates from the nutrient supply vessel through the dialyzer and back to the nutrient supply vessel.

The flow of nutrient through the circulating system may be controlled by varying the pumping rate or by valve 142; similarly the flow of culture through the circulating system may be controlled by varying the pumping rate or by valve 144. If desired the flow rate of each of the systems may be measured by appropriate meters.

To insure uniform dispersion of the culture within the fermentor 110, an agitator 146 driven by an external motor 148 is mounted in the fermentor. The fermentor is provided with baffles 150 to aid in mixing. Primary aeration may be carried out by use of aerator 156 mounted in fermentor 110 and connected by conduit 158 to an external source, not shown, of sterile air, oxygen or other gas. Vent 160 permits venting excess gas.

Nutrient supply vessel 130 may be provided with agitator 162 driven by external motor 164 and with aerator 152 which is connected by conduit 154 to an external source, not shown, of sterile air, oxygen or other gas. Vent 166 permits release of excess gas, which, if desired, may be introduced into the fermentor 110 through conduit 158. It is one of the features of this invention that aeration of the fermenting culture may also be carried out indirectly by aerating the nutrient supply. The dissolved air, oxygen or other gas, is then transferred through through the dialyzer to the culture. By the use of indirect aeration of the culture, foaming due to aeration may be avoided in the fermentor. In this manner delicate types of cultures, such as mammalian cell suspensions, may grow better, not being damaged by use of the usual primary aeration procedure.

Figure 2:
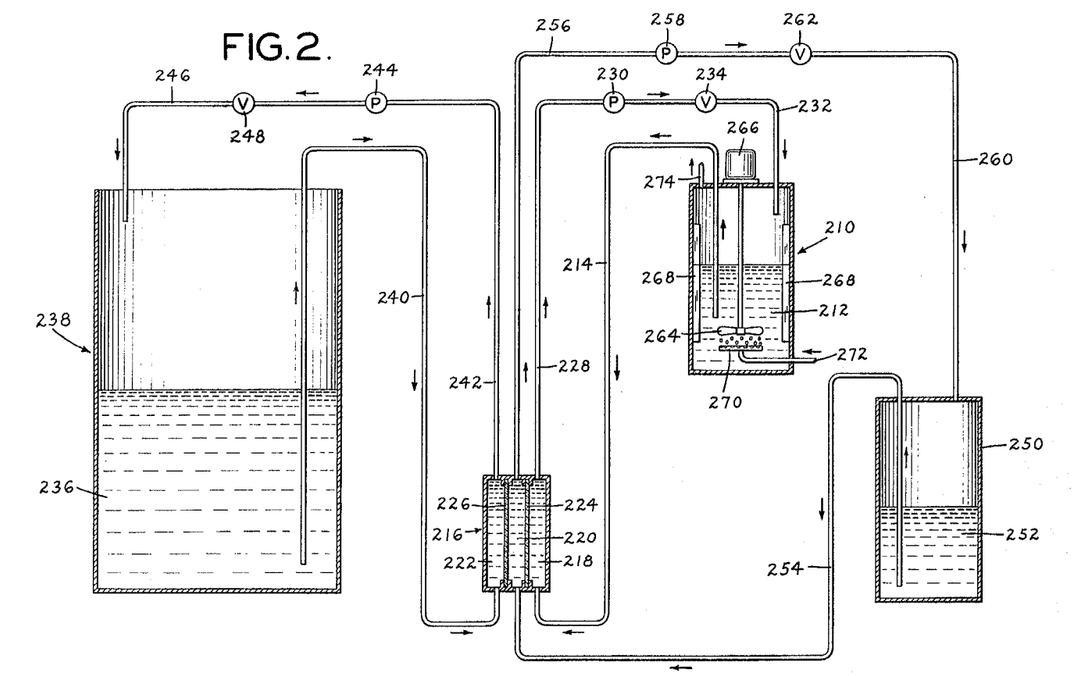
FIGURE 2 is a schematic view of a multiple stage dialysis fermentation system utilizing a reservoir intermediate the nutrient supply and fermentor.

An alternate embodiment of the invention is the multiple stage dialysis fermentation system shown in FIGURE 2 which consists of a double exchange-dialysis system having a fermentation region, a dialysis region, a nutrient supply region and a reservoir region. The dialysis region consists of a dialyzer assembly which provides for the mounting of two semi-permeable membranes having porosities different from each other. One semi-permeable membrane may have a relatively fine porosity, for example, about 3 millicon mean pore diameter, being included in the general class of "membranes," and the other semipermeable membrane may be included in the general class "ultra-filters," which have relatively coarse porosity, for example, and about 300 millicron mean pore diameter.

In FIGURE 2 the fermentor 210 contains culture 212 which is circulated from fermentor 210 through conduit 214 into remote dialyzer 216. The dialyzer comprises three chambers 218, 220, 222 separated by ultra-filter 224 and membrane 226. The culture enters chamber 218, contacts one side of ultra-filter 224 as the culture circulates through the chamber, and is removed from the chamber through conduit 228 which is connected to the suction side of pump 230. The culture is returned to the fermentor 210 through conduit 232; the flow of culture may be controlled by varying the pumping rate or by valve 234 located in conduit 232.

The nutrient 236 is contained in nutrient supply vessel 238 and is circulated through conduit 240 which extends from below the liquid level of the nutrient to the inlet of chamber 222 of dialyzer 216. The circulating nutrient contacts one side of membrane 226 as the nutrient passes through dialysis chamber 222, and is removed from the chamber through conduit 242 which is connected to the suction side of pump 244. The nutrient is recirculated to the nutrient supply tank 238 through conduit 246; the flow of nutrient may be controlled by varying the pumping rate or by valve 248 located in conduit 246.

Reservoir vessel 250 contains water, or aqueous solution, 252 which is circulated to dialyzer 216 by means of conduit 254 extending from below the liquid level in the reservoir vessel to the inlet of chamber 220 of dialyzer 216. Water, or aqueous solution, 252 from the reservoir contacts one side each of ultra-filter 224 and membrane 226 as it passes through chamber 220, and is removed by conduit 256 which is connected to the suction side of pump 258. The water, or aqueous solution, 252 is recirculated to reservoir vessel 250 through conduit 260; the flow rate may be controlled by varying the pumping rate or by valve 262 in conduit 260.

In order to mix the culture, the fermentor 210 may be equipped with agitator 264 driven by motor 266. The thoroughness of agitation is aided by the use of baffles 268 which are mounted inside fermentor 210. Primary aeration may be carried out by means of aerator 270 mounted in fermentor 210 and connected by conduit 272 to an external source, not shown, of sterile air, oxygen or other gas. Vent 274 permits the venting of excess gas.

The fermentor region and the nutrient supply region function as in the preferred embodiment. The reservoir region functions to concentrate particles which are desirably separated from the fermentor region. Thus, the dialyzer sorts and concentrates several size classes of particles and molecules. For example, cells of a microorganism growing in the fermentor region are retained and concentrated on the fermentor side of the ultra-filter. Macromolecular products, for example, an exotoxin, polysaccharide, and the like, are able to pass through the ultra-filter but not through the membrane. Such products are retained and concentrated in the reservoir region. Small molecule products from the fermentor are able to pass through both membrane and ultra-filter, thus entering and being diluted in the larger volume of liquid in the nutrient supply region. Small molecule nutrients from the nutrient supply region are able to pass through both membrane and ultra-filter thus entering and nurturing the culture in the fermentor.

The embodiment may also function to grow symbiotic organisms by placing one group in a favorable environment in the fermentor and the other group in a different favorable environment in the suitably modified reservoir. Such sybiotic or commensal pairs or groups of microorganisms include parasitic microorganisms that commonly grow with cells of a higher form of life, for instance, oral fusiform bacteria and spirochete bacteria, spirochetes and mammalian tissue, rickettsiae and lower or higher animal or human tissue, viruses and plant, animal or human tissue, bacteriophage and bacteria, and the like.

Figure 3:
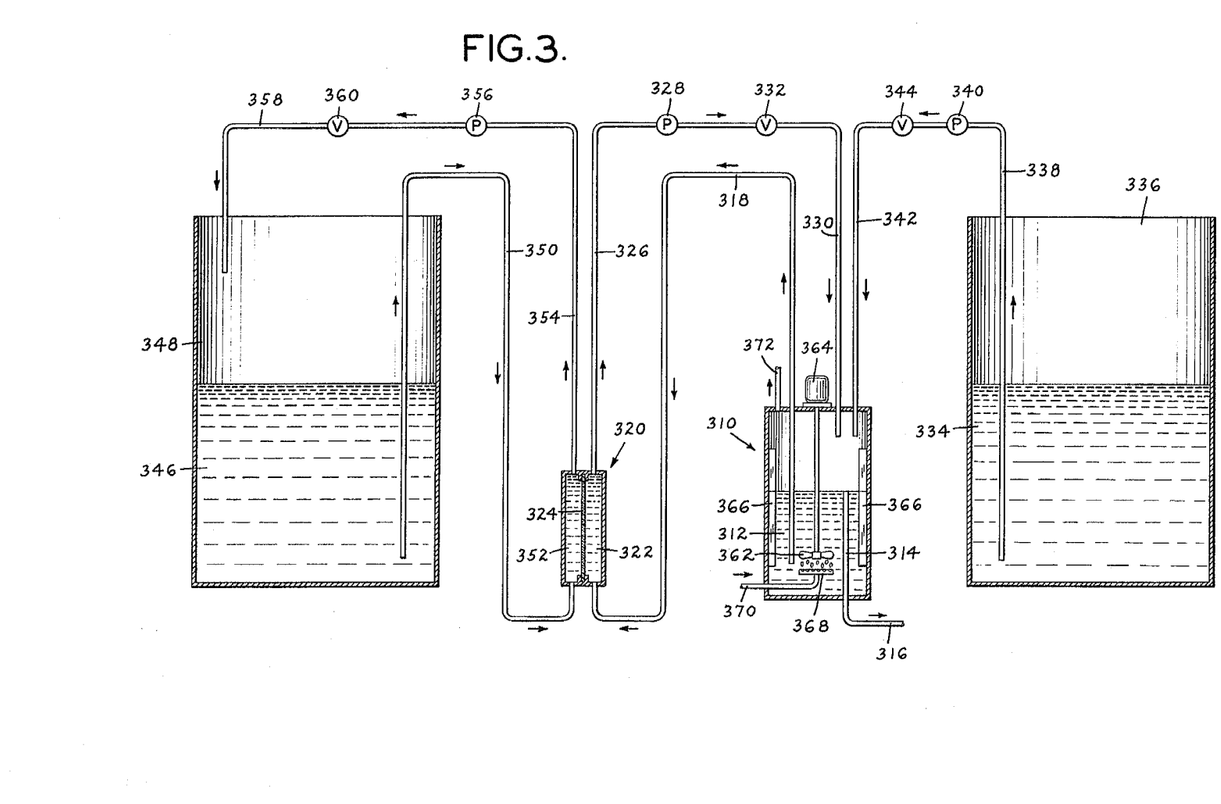
FIGURE 3 is a schematic view of a continuous extraction dialysis fermentation system utilizing continuous extraction by dialysis of the products of fermentation.

Another embodiment of the invention, a continuous extraction-dialysis system, is shown in FIGURE 3. The system comprises a fermentation region, a dialysis region, a nutrient supply region, and a reservoir region, together with appropriate conduits and pumps connecting the regions.

In this embodiment, the fermentor culture is maintained in a steady state by continuously adding concentrated nutrient at the same rate at which it is metabolized. Simultaneously, culture is withdrawn so as to maintain constant population and fermentor volume. The culture is also continuously circulated through the dialyzer, where it is exchanged against a continuously circulating stream of water which need not be sterile. In this manner the products of metabolism are constantly extracted and valuable fermentation products may be readily recovered from the clear diffusate. Thus, the production of the system is maintained on a continuous basis. The system is particularly applicable to a continuous, single stage operation under steady state conditions with internal control, although other types of operation are also possible.

The nutrient in concentrated form is supplied from the nutrient supply region directly to the fermentor. The dialysis region consists of a two section dialyzer. However, instead of exchanging nutrient against products of the fermentation, the dialyzer acts principally to remove the products of fermentation.

A general function and advantage of this system of dialysis fermentation is to extract the diffusible products of fermentation from the fermentor so as to allay their toxic effects in the fermentor and to facilitate their recovery in the case of a valuable product. For instance, in the production of lactic acid by a fermentation process, the lactic acid may be readily recovered from the reservoir region, in contrast to the difficulty of recovering lactic acid in known processes.

Another general function and advantage of this system is that the diluent need not be sterile, because any possible interfering organisms are too large to pass through the dialyzer into the fermentor. That is, undesirable organisms are filtered out by the dialyzer membrane. The use of non-sterile diluent results in economy of operation over the known processes which require sterile conditions in fermentation operation.

In FIGURE 3, fermentor 310, containing culture 312, is equipped with overflow pipe 314 connected to an external collection system, not shown, by means of conduit 316. Culture is circulated from fermentor 310 by means of conduit 318 extending from below the level of the culture to dialyzer 320. The culture passes through chamber 322 of the dialyzer contacting membrane 324 in its passage. The culture is removed from the dialyzer 320 by means of conduit 326 connected to the suction side of pump 328. Culture is returned to the fermentor 310 through conduit 330; the flow of culture may be controlled by varying the pumping rate or by valve 332 mounted in conduit 330.

Concentrated nutrient 334 is contained in nutrient supply vessel 336 and is injected into the fermentor 310 through conduit 338, extending from below the nutrient level in vessel 336 to the suction side of pump 340, and through conduit 342, extending from the discharge side of pump 340 into fermentor 310. The flow of nutrient may be controlled by varying the pumping rate or by valve 344 mounted in conduit 342.

Diluent 346, which may be water or an aqueous solution, is contained in reservoir 348. The diluent is circulated to dialyzer 320 through conduit 350 which extends from below the diluent level in the reservoir to the inlet of dialyzer chamber 352. The diluent passes through the chamber 352 contacting membrane 324 in its passage. The diluent is removed through conduit 354 connected to the suction side of pump 356 and is returned to the reservoir through conduit 358; the flow rate may be controlled by varying the pumping rate or by valve 360 mounted in conduit 358.

In order to assure uniformity of the contents of fermentor 310 there is provided agitator 362 driven by motor 364. Baffles 366 mounted within fermentor 310 aid in the thorough dispersion of air and uniformity of distribution of the culture. Primary aeration may be carried out by use of aerator 368 mounted in fermentor 310 and connected to an external source, not shown, of sterile air, oxygen or other gas by conduit 370. Vent 372 permits venting of excess gas.

The volume of culture in the fermentor is maintained constant by means of overflow pipe 314. Whenever the volume in the fermentor exceeds a predetermined amount, the excess material enter overflow pipe 314 and may be removed from the system by appropriate conduits and pumps, and a like.

In any embodiment the ratio of size of the nutrient supply vessel containing the nutrient may be varied with relation to the size of the fermentor vessel. The preferred ratio of the nutrient supply vessel to the fermentor is between about 4:1 to 10:1. However, this ratio may be varied over a range as wide as 100:1 to 1:100. The nutrient supply region may be of relatively simple construction and need not be equipped or operated with all the accessories necessary to the fermentor, thus resulting in economies of construction and operation.

In order more clearly to disclose the nature of the present invention, specific examples of the practice of the invention are hereinafter given. It should be understood, however, that this is done solely by way of example and is intended neither to delineate the scope of the invention nor to limit the ambit of the appended claims.

EXAMPLE I

The process of dialysis fermentation was carried out with the system shown in FIG. 1. The test organism was *Serratia marcescens*, strain 8UK, a common pigmented aerobic unicellular bacterium that has been used previously as a test organism in studies of bacterial growth and concentration. In preparation for an experiment a stock culture was streaked on trypticase-soy agar plates. After incubation at 30° C. for 24 hours, a uniformly pigmented colony was picked and transferred to 100 ml. of medium, described below, contained in a 250 ml. Erlenmeyer flask. The flask was incubated on a rotary shaker at 200 r.p.m. for 16 hours at 30° C., this culture then being used as a source of inoculum for the experimental fermentation.

The fermentor consisted of a 5-liter capacity Pyrex battery jar with an appropriate cover agitator, baffles, and other accessories of a conventional type. The fermentor was charged with 3-liters of synthetic medium of the following composition:

| | Grams per liter |
|---|---|
| Dibasic ammonium citrate | 22 |
| $Na_2SO_4$ | 0.5 |
| $KH_2PO_4$ | 5 |
| $MgSO_4.7H_2O$ | 8 |
| NaCl | .04 |
| $FeSO_4.7H_2O$ | .04 |
| $MnSO_4.4H_2O$ | .04 |
| Glucose | 20 |

The medium constituents, with the exception of glucose, were dissolved in hot tap water and adjusted to pH 7.7 with $NH_4OH$. The fermentor with its contents was sterilized in an autoclave at 120° C. for 20 min. The post-sterilizing pH was 6.8. The glucose was sterilized separately and added aseptically to the fermentor contents. An antiform agent was added to provide a final concentration of about 50 p.p.m.

The nutrient supply vessel consisted of conventional glass fermentor of 14 liters capacity and charged with 12 liters of the above medium. The agitator was driven at about 350 r.p.m. Sterile air was supplied to the nutrient supply vessel at a rate of 9 liters of air per minute.

The dialyzer consisted of a clear plastic rectangular plate-and-frame type arrangement, used so as to contain two chambers and one membrane, each membrane having approximately 800 sq. cms. of surface area exposed to the circulating culture and nutrient. The membrane employed was the Visking cellulose type, commonly referred to as dialysis membrane. Since the test dialyzer was constructed of plastic, it was necessary to employ relatively low temperatures for sterilization, the assembled unit being heated at 75° C. for 6 hours.

The nutrient supply vessel, the fermentor and the dialyzer were assembled with appropriate gum rubber tubing, pumps, and clamps so as to provide a system as shown in FIG. 1. Both the fermentor and nutrient supply vessel were immersed in a constant temperature water bath maintained at 30° C. The fermentor agitator was driven at 875 r.p.m. Sterile air was supplied to the fermentor at a rate of 9 liters of air per minute. The rate of circulation of both the fermentor and reservoir contents to the dialyzer was at a rate of about 130 ml./min.

After the system was assembled and allowed to equilibrate, the experiment was initiated by inoculating 30 ml. of the inoculum culture into the fermentor so as to provide an initial cell concentration of approximately 500 million viable cells per ml. This relatively high level of inoculum was selected simply as a convenience, a wide range of inoculum sizes being allowable.

Table I shows results of a typical experiment under these conditions, the course of growth being extended over a 48-hour incubation period. Samples were removed from the fermentor at intervals and assayed for the number of cells, both total and viable, and the amount of cell matter, both dry weight and deoxyribonucleic acid (DNA). Total counts were obtained by direct observation in a microscope using a conventional Petroff-Hauser counting chamber and appropriate dilutions. Viable counts were obtained by the conventional streak plate technique. Cell matter was measured by centrifuging a sample and decanting the supernatant fluid, resuspending the pellet in water, recentrifuging, again decanting, and weighing the wet pellet. For dry weight determinations, the sample was dried in an oven at 105° C. to constant weight. DNA was analyzed by the method of Seibert (J. Biol. Chem., 133, 593–604, 1940); the method is one commonly employed and is based on a color reaction with diphenylamine. Dry weight and DNA analyses provide a measure of total cell matter and an indirect measure of total cell numbers, used to supplement the cell counts as a measure of population growth.

*Table I*

| Sample time, hours | Cell count, billions/ml. | | Cell matter, mg./ml. | |
|---|---|---|---|---|
| | Total | Viable | Dry wt. | DNA |
| 0 | 0.70 | 0.35 | | |
| 3 | 9.5 | 6.5 | | |
| 6 | 90 | 50 | 7.5 | .63 |
| 9 | 160 | 120 | 14.1 | 1.30 |
| 12 | 210 | 165 | 14.9 | 1.39 |
| 15 | 250 | 190 | 18.8 | 1.65 |
| 24 | 390 | 300 | 21.8 | 2.00 |
| 27 | 465 | 400 | 26.2 | 2.35 |
| 30 | 580 | 490 | 36.1 | 3.30 |
| 33 | 625 | 510 | 48.1 | 4.65 |
| 48 | 680 | 600 | 56.3 | 5.15 |

The results shown in Table I revealed that the course of growth followed a characteristic pattern for the organism, except that a higher level of growth was attained and the population continued to increase over an extended period of time, reaching a viable cell population at 24 hours of 300 billion cells per ml. and at 48 hours of 600 billion cells per ml. In a comparable control experiment, 3 liters of the same medium were charged into the same fermentor and provided the same aeration, agitation, and other experimental conditions, except that the fermentor was not allowed to dialyze against a nutrient supply. In the control situation, the viable count reached a maximum at 24 hours, 150 billion viable cells per ml., and became less at 48 hours, 9 billion viable cells per ml. Functioning of the dialysis fermentation system and its superiority over a conventional method of fermentation, using a test fermentation, were thus demonstrated.

EXAMPLE II

An important feature of the dialysis fermentation process shown in FIG. 1 is its capability of being undertaken in larger proportions of size. This capability of being scaled up is illustrated by an experiment using larger vessels, the results of which are shown in Table II. Experimental conditions were essentially the same as described above, except that the fermentor consisted of 14-liter fermentor charged with 10 liters of the medium, while the nutrient supply vessel consisted of a similarly designed stainless steel fermentor of about 200 liters capacity charged with 100-liters of medium. The ratio of nutrient supply to fermentor contents thus increased from 4:1 in the above experiment to 10:1 in the present experiment, illustrating ability to control this factor of the fermentation. The fermentor contents were maintained in a water bath at 30° C., the agitator was driven at 875 r.p.m. and aeration was at a rate of 20 liters of sterile air per minute. The nutrient supply vessel was maintained at 25° C., illustrating the ability to separately control the temperature of the fermentor and the nutrient supply vessel. Both the culture from the fermentor and the nutrient from the reservoir were circulated by appropriate pumps and rubber tubing through the dialyzer at rates of about 500 ml./min.

*Table II*

| Sample time, hours | Cell count, billions/ml. | | Cell matter, mg./ml. | |
|---|---|---|---|---|
| | Total | Viable | Dry wt. | DNA |
| 0 | | .12 | | |
| 8 | | 90 | 9.35 | .94 |
| 12 | 140 | 110 | | |
| 16 | 180 | 165 | 17.8 | 1.51 |
| 20 | 220 | 200 | 19.2 | 1.67 |
| 24 | 330 | 309 | 22.6 | 2.05 |
| 27 | 400 | 360 | 27.6 | 2.35 |
| 36 | 480 | 425 | | |
| 40 | 560 | 460 | 39.5 | 4.10 |
| 44 | 600 | 480 | 46.7 | 4.20 |
| 48 | 610 | 500 | 51.6 | 4.61 |

The results in Table II revealed that the course and magnitude of growth in larger scale of size was comparable to that in the smaller scale. Reason and experience indicates that still greater magnification in scale will bring essentially similar results. Our process of conducting dialysis fermentation is not inherently limited by the process itself in the size of vessels in which it may be accomplished, and the design of the dialyzer allows expansion and replication.

Our invention also permits manipulation of growth conditions which we were not able to attain by the usual fermentation process. Extremely high populations of cells result and illustrate the essentially unrestricted concentration that may be obtained in liquid culture by use of our process of dialysis fermentation. The cell concentration was increased to more than a thousand-billion viable cells per milliliter, and probably could be increased further. These populations were attained by supplemental addition of nutrient to the nutrient supply vessel as the fermentation progressed and the original supply became depleted. The added nutrient was thus indirectly fed to the culture. The agitation and aeration must also be high during supplemental feeding in order to meet the high oxygen demand of the culture. Although supplemental feeding was found relatively ineffective in control fermentations, it resulted in greatly increased yields in the dialysis fermentation system of this invention.

We have also found that secondary dehydration may be carried out using our system. The spent nutrient supply may be withdrawn after completion of the normal growth cycle and replaced by an excess of the hydrophilic colloid such as polyethylene glycol having a molecular weight of about 20,000. The osmotic passage of water into the glycol removes water from the fermentor and causes the culture to become greatly concentrated. The process may be continued until a desired degree of dehydration is reached or until the culture can no longer be pumped. The usual concentrating methods, such as centrifugation, can thus be obviated. Secondary osmotic concentration not only effects an economy and simplification of equipment, but also provides an element of saftey in concentrating infectious microorganisms. These two features of supplemental feeding and secondary concentration are illustrated by the result of Example III.

EXAMPLE III

The experimental conditions of Example I were repeated, employing *S. marcescens* growing in the same medium, except that supplemental feeding was accomplished by adding the equivalent of 0.25% complete medium at 3, 6, 9 and 12 hours, and then adding an additional equivalent of 1% glucose at 14 hours. Secondary osmotic concentration was accomplished by withdrawing the nutrient solution from the nutrient supply vessel after 25 hours and replacing it with a concentrated slurry of polyethylene glycol. The results are shown in Table III.

Table III

| Sample time, hours | Cell count, billions/ml. | | | | Cell matter, mg./ml. | | | |
|---|---|---|---|---|---|---|---|---|
| | Total | | Viable | | Dry wt. | | DNA | |
| | Dialysis | Control | Dial. | Cont. | Dial. | Cont. | Dial. | Cont. |
| 0 | .68 | .80 | .35 | .36 | | | | |
| 3 | 10 | 10 | 5.5 | 4.2 | | | | |
| 6 | 95 | 31 | 50 | 15 | | | | |
| 9 | 160 | 80 | 120 | 45 | 18.2 | 7.0 | 1.75 | .55 |
| 12 | 400 | 170 | 250 | 80 | 23.6 | 8.0 | 2.5 | .75 |
| 25 | 2,100 | 300 | 1,300 | 190 | 83.1 | 15.8 | 7.9 | 1.6 |
| 49 | *5,600 | | *2,500 | | *148.4 | | *13.1 | |

*Secondary concentration by hydrophilic colloid.

The results in Table III show that populations in excess of a thousand billion cells per ml. can be achieved by dialysis supplement feeding during growth. When a culture of this density is centrifuged, the packed cells actually occupy about 50% of the total volume. In contrast, with the control situation using a conventional fermentation process, populations almost an order lower in magnitude occurred, even though these control results approximate the highest yields previously reported in the literature for this bacterium. When the nutrient supply in the dialysis fermentation was replaced after 25 hours with a hydrophilic colloid, further concentration occurred to an extent that the culture could no longer be pumped and sampling became inaccurate. Counts and analyses approaching theoretical for packed cells were recorded.

EXAMPLES IV–IX

Separate control of the nutrient supply and the fermentation, inherent in the process of dialysis fermentation of this invention, further is illustrated by the results of trials recorded in Table IV, in which trials the ratio of the volume of nutrient supply to fermentor contents was varied over a range. The procedure of Example III was repeated except that the nutrient supply volume to fermentor culture volume was varied. A 14-liter capacity vessel was used for the nutrient supply and a 5-liter capacity vessel for the fermentor, volumes in each being adjusted to accomplish the ratios shown in the Table IV. The results demonstrate that as the nutrient supply to fermentor ratio is increased, so the concentration of cells produced at the end of a growth period of 48 hours is increased. Just as supplemental feeding was found capable of producing concentrations in excess of 1000 billion cells per ml., similarly a relatively high ratio of nutrient supply to fermentor volume produces much the same results. This illustrates the essentially unrestricted density of cells obtainable by our process of dialysis fermentation.

Table IV

| Example | Nutrient supply fermentor ratio | Cell count, billions/ml. | | Cell matter, mg./ml. | | Packed cell volume, percent |
|---|---|---|---|---|---|---|
| | | Total | Viable | Dry wt. | DNA | |
| IV | 0:1 | 235 | 170 | 8.3 | 0.76 | 4 |
| V | 2:1 | 340 | 190 | 18.2 | 1.90 | 8 |
| VI | 4:1 | 525 | 350 | 32.0 | 3.00 | 13 |
| VII | 6:1 | 1,290 | 650 | 53.5 | 6.55 | 22 |
| VIII | 8:1 | 1,450 | 840 | 68.3 | 5.25 | 30 |
| IX | 10:1 | 2,100 | 1,340 | 91.9 | 8.95 | 40 |

EXAMPLE X

The procedure of Example I was repeated using the assembly shown in FIGURE 1, except that dissolved air was supplied to the fermentor indirectly by aerating and agitating the nutrient supply vessel and then transferring the dissolved air by diffusion through a membrane to the culture circulated on the opposite side of the membrane. The test organism used again was *Serratia marcescens*. In a control experiment, it was shown that essentially no growth could be accomplished if the fermentor were flushed with nitrogen and then closed and if the nutrient supply continuously were gassed with nitrogen. Under these conditions oxygen is not available and the aerobic organism fails to grow. However, when the gas passed through the 12 liters of nutrient in the supply vessel was changed to air (9 liters/min.; agitator at about 350 r.p.m.), the dissolved air was transferred from the nutrient supply vessel across the membrane surface to the culture, circulated from the fermentor. Appreciable growth resulted, the population reaching a level of 16 billion total cells and 14 billion variable cells per ml. in 48 hours. Although these results did not fully equal the level of growth obtainable when this aerobic organism is fully supplied with its oxygen demand by primary aeration in the fermentor, they did clearly illustrate the principle that air can be indirectly supplied to the fermentor by dialysis from the nutrient supply region.

EXAMPLE XI

A procedure was carried out using the medium, culture and nutrient and using the process shown in FIGURE 3 as a continuous extraction dialysis system. The fermentor culture was maintained apparently in a steady state by continuously adding concentrated nutrient. Simultaneously culture was withdrawn so as to maintain a fairly constant population and fermentor volume. The culture also was continuously circulated through the dialyzer, where it was dialyzed against a continuously circulating stream of non-sterile water. The experiment progressed for more than 30 hours. A representative population of the following density was observed at 27 hours: total count, 360 billion cells per ml.; viable count, 325 billion cells per ml.; dry weight, 24.6 mg. per ml.; packed cell volume, 20%.

In yet another trial, the object of medium simplification was attained by replacing the medium usually employed in the fermentor vessel with water. A casein-soy digest medium was used in the nutrient supply vessel. Without wishing to be bound by a particular theory of operation, it is believed that during the period of equilibration small molecular weight nutrients diffuse from the complex nutrient supply into the water in fermentor. Thus there is provided a water-clear, simplified environment, free of protein and other large molecular weight constituents of the complex medium used in the nutrient supply. Under these conditions, *Serratia marcescens* grew comparably well as when complete medium was employed in the fermentor. The trial demonstrated the capability of our process of dialysis fermentation to propagate microorganisms in an environment free of complex substances but still retaining their beneficial effect.

In order to test membrane materials for use in the practice of this invention, a novel flask was designed. The test flask was fabricated from two, four-inch diameter glass pipe caps, between which were placed semi-permeable membrane material to be tested. Comparative diffusivity tests were made using glucose. The materials tested included membranes and ultra-filters made with stainless steel, porcelain, asbestos, glass, reconstituted cellulose, and plastics, such as styrene and other vinyls, alone or impregnated into fabric. Results of the tests with various membranes revealed wide differences in dialysis rates and structural qualities. In general, thickness, porosity and void space governed diffusivity.

Figure 4:
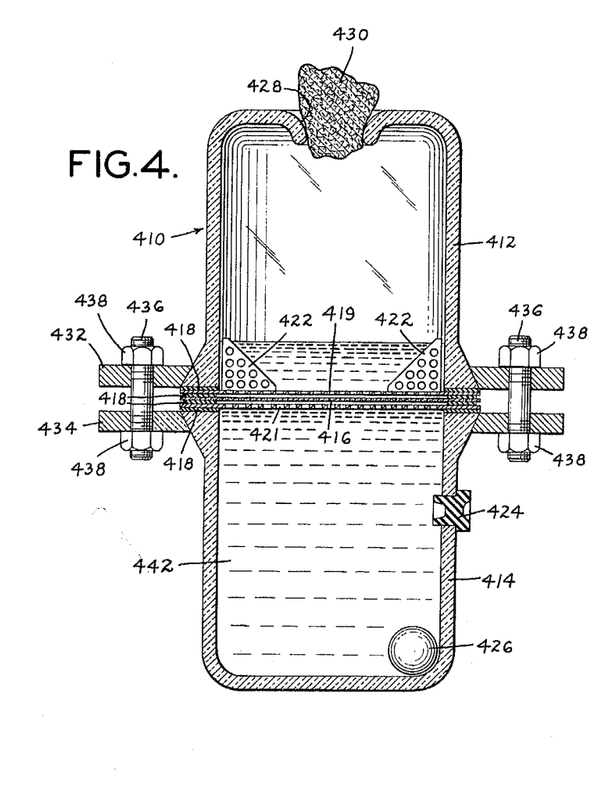
FIGURE 4 is a section view of a semi-permeable membrane test flask.

The membrane test flask is shown in FIGURE 4. In FIGURE 4, the test flask 410 consists of upper chamber 412 and lower chamber 414. The dialysis membrane 416, which is to be tested, is mounted between the two chambers. The membrane is supported by upper foraminous plate 419 and lower foraminous plate 421. Foraminous baffles 422 are mounted on upper foraminous plate 419. Gaskets 418 provide a liquid tight seal between adjacent components and serve to space the membrane apart from the supporting plates. The lower chamber 414 contains rubber charging and sampling diaphragm 424 and a freely rollable marble 426. The upper chamber 412 has opening 428 which is closed by cotton plug 430. The two chambers are held together by steel flanges 432 and 434, which are arranged to be drawn together by stud bolts 436 and nuts 438. The culture 440 is inoculated into the upper segment 412 through opening 428 and is supported by test membrane 416. Sterile medium 442 is charged into the lower chamber 414 so as completely to fill it except for a small bubble to allow for expansion.

The dialysis flask is sterilized with the lower chamber 414 nearly filled with medium. It is usually necessary during sterilization to add about 100 milliliters of hot water into the upper chamber 412 before autoclaving in order to protect the membrane from irreversible changes during heating.

In operation, the flask may be firmly fastened to a rotary shaker. Satisfactory shaking action is indicated by marble 426 rolling in lower chamber 414 and by a good circular action of the culture in the upper chamber passing through and over the baffles to provide vigorous agitation. As an alternate to shaking, the medium in the bottom chamber may be circulated by adding inlet and outlet connections. Thus the flask may also be used statically.

With certain media or organisms it is preferable to add anti-foam agent to control excess foaming. An anti-foam agent, at a final concentration of about 50 parts per million, may be used. If excess foaming or splashing results in wetting of cotton plug 430, the plug may be replaced by a rubber stopper containing a plugged glass tube extension, or the pipe cap used for the upper chamber may be replaced with a glass pipe reducer.

Table V shows the results of tests on selected membranes, using the membrane test flask shown in FIGURE 4. Membranes were tested for applicability in dialysis fermentation both in their diffusivity to a test nutrient, glucose, and in their effects on growth of a test organism, *Serratia marcescens*. The glucose diffusivity test procedure consisted of filling the lower chamber of the flask with 0.1% aqueous glucose solution and placing 250 ml. of water in the upper chamber thereof. The assembled flask was then shaken. The time, in minutes, required for the glucose concentration to reach 50% of the calculated maximum was determined by the conventional anthrone reaction and recorded as the half-equilibration time ($ET_{50}$, min.). The bacterial growth test procedure consisted of filling the lower chamber with sterile medium, as formulated above. The upper chamber was charged with 100 ml. of sterile water and allowed to equilibrate for at least an hour. The upper chamber was then inoculated with the test organism, essentially as described above. The flask then was placed on a rotary shaker operating at about 200 r.p.m. and allowed to incubate at 30° C. for 48 hours, removing samples terminally and at other times as desired. The extent of growth was measured by the methods described above.

Table V

| Example | Type | Membrane tested avg. pore size, in μ | Glucose diffusivity $ET_{50}$, min. | Growth of *S. marcescens*, 48 hr. | | | |
|---|---|---|---|---|---|---|---|
| | | | | Cell count, billions/ml. | | Cell matter, mg./ml. | |
| | | | | Total | Viable | Dry wt. | DNA |
| XII | "Visking" cellulose | 2.4 | 150 | 125 | 90 | 9.5 | 1.10 |
| XIII | "Hi-Flex" polyvinyl | ca. 3 | 90 | 85 | 80 | 9.1 | .85 |
| XIV | "Polypore WA" nylon mesh-plastic. | 100 | 65 | 90 | 90 | 8.5 | .80 |
| XV | "Gelman AM-8" cellulose ester. | 250 | 45 | 120 | 80 | 9.8 | .98 |
| XVI | "Gelman Proc-1119" glass-reinforced cellulose ester. | 400 | 360 | 98 | 95 | 8.7 | .80 |
| XVII | Gum rubber blank (Control). | 0 | 0 | 28 | 20 | 1.95 | 0.18 |

Results of tests with five selected membranes are shown in Table V. The results reveal that all "dialysis membranes" (e.g., Polypore WA nylon mesh-plastic, Gelman AM-8 cellulose ester, and Gelman Proc-1119 glass-reinforced cellulose ester) provided suitable rates of glucose diffusion and did not adversely affect growth of the test organism. The results also demonstrated the use of the test flask shown in FIGURE 4 for selecting ultra-filters and dialysis membranes for use in the embodiment of FIGURE 1.

In addition to the glucose diffusivity tests shown in Table V, similar tests were performed on more than 30 other membranes of various types, including the following: Schleicher-Schuell cellulose ultra-filters (porosity varying from 0.005 to 3.00 microns), other German cellulose ester ultra-filters, Porelon, porous stainless steel, Pyrex sintered glass, Selas unglazed porcelain, Amfab glass mesh-Teflon, and Hormann-Seitz asbestos. Still others were considered but not specifically tested.

In addition to the microbial growth tests shown in Table V, similar tests were performed on a number of different types of microorganisms so as to demonstrate the broad applicability in use of a typical dialysis membrane, Visking cellulose. The following microorganisms were among those so tested: *Bacillus megaterium*, *Bacillus cereus*, *Bacteroides* sp., *Escherichia coli*, *Hemophilus influenzae*, *Lactobacillus acidophilus*, *Penicillium notatum*, *Saccharomyces cerevisiae*, *Streptococcus lactis*, *Streptomyces griseus*, and *Tetrahymena pyriformis*. Growth in all of the above instances was not adversely affected by the presence of the membrane, and the arrangement of the flask in fact resulted in concentration of the cultures during growth. By these growth tests, the possible toxic effect of the membrane on the microorganism could be ascertained, as well as the possible effect of the culture on the membrane.

Figure 5:
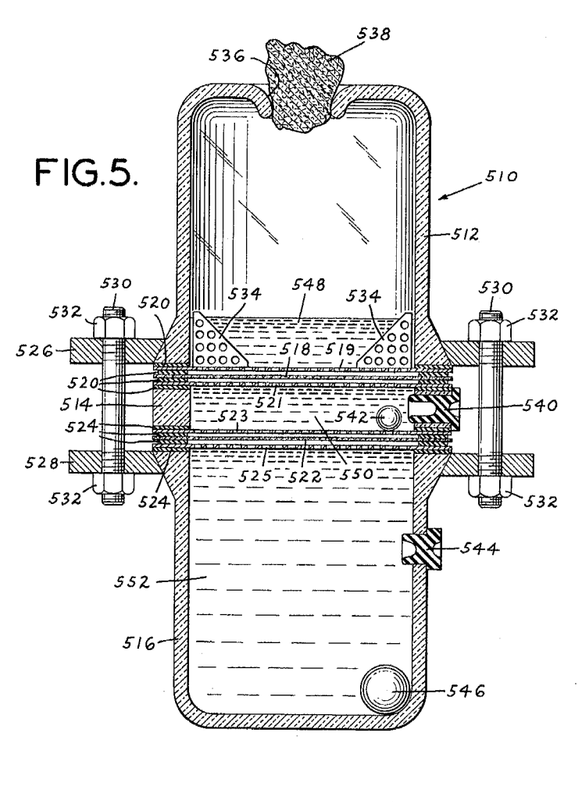
FIGURE 5 is a section view of an alternate embodiment of a semi-permeable membrane test flask.

FIGURE 5 shows an alternate embodiment of the test flask which comprises a flanged, double membrane test flask.

The test flask 510 is composed of upper chamber 512, a middle chamber 514, and a lower chamber 516. An ultra-filter 518 is mounted between upper chamber 512 and middle chamber 514, is separated therefrom by gum rubber gaskets 520, and is supported by upper foraminous plate 519 and lower foraminous plate 521. A dialysis membrane 522 is mounted between middle chamber 514 and lower chamber 516, is separated therefrom by gum rubber gaskets 524, and is supported by upper foraminous plate 523 and lower foraminous plate 525. The three chambers are held together by steel flanges 526, 528 which are arranged to be drawn together by stud bolts 530 and nuts 532.

Upper chamber 512 contains perforated baffle 534 mounted on foraminous plate 519 and also has opening 536 which is closed by cotton plug 538. Middle chamber 514 has in its outer wall, rubber sampling diaghragm 540 and contains freely rollable marble 542. Lower chamber 516 has rubber sampling diaphragm 544 in its outer wall and contains freely rollable marble 546.

In operation, upper chamber 512 contains culture 548 in contact with ultra-filter 518. The middle chamber 514 contains sterile aqueous solution 550, and the lower chamber 516 contains sterile nutrient 552.

The flask is designed with two medium chambers and a culture chamber. The upper ultra-filter restricts passage of cells but not molecules. The lower dialysis membrane restricts passage of large but not small molecules. Sorting as well as concentration of macromolecules, such as bacterial toxins, can thus be achieved. This was demonstrated by inoculating Corynebacteriam diphtheriae into the top chamber, initially filled with sterile water. The middle chamber also initially contained sterile water. The bottom chamber initially contained a nutrient supply. Passage of small molecules through both the lower dialysis membrane and the upper ultra-filter was indicated by growth of the bacteriam, whose cells however were restricted to the top chamber. Of the toxin produced during the course of growth, some remained with the cells in the top chamber, some passed into the middle chamber, but further passage was not detected. The presence of toxin was tested by conventional animal toxicity tests with guinea pigs. The results thus demonstrated the principle of sorting and concentration of molecules through use of a plurality of chambers in a dialysis fermentation system with membranes of different pore size. The results also demonstrated the use of the test flask shown in FIGURE 5 for selecting ultra-filters and dialysis membranes for use in the embodiment of FIGURE 2.

As an alternate embodiment, the ulta-filter or membrane may be formed from glass or other material which may be welded into a unitary structure forming the chambers.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The process of conducting a fermentation with microorganisms comprising the steps of circulating a nutrient solution between a nutrient supply vessel and a first chamber of a remote dialyzer, circulating a diluent solution between a reservoir vessel and a second chamber of said remote dialyzer, circulating a culture between a remote fermentor and a third chamber of said remote dialyzer, said second chamber of said remote dialyzer being intermediate said first and third chambers and separated therefrom by semi-permeable membranes, the semi-permeable membrane between said first and second chambers having openings smaller than the semi-permeable membrane between said second and third chambers, whereby a sorting and size classification of fermentation products takes place.

2. A continuous process for conducting a fermentation with microorganisms comprising the steps of feeding a nutrient solution to a fermentor containing a culture of microorganisms, circulating said culture between said fermentor and a remote dialyzer, circulating a diluent between a reservoir and said dialyzer, whereby the diffusible products of fermentation are removed thus allaying their toxic effects in said fermentor and facilitating their recovery.

3. Process of conducting a fermentation with microorganisms that comprises circulating an aqueous solution between a supply vessel and one chamber of a remote dialyzer, circulating a culture of microorganisms between a second chamber of said dialyzer and a remote fermentor, replacing said aqueous solution with a hydrophilic liquid, and circulating said hydrophilic liquid through said remote dialyzer whereby water is removed from said culture and secondary concentration of the culture is accomplished.

4. Process for conducting a fermentation with microorganisms, that comprises circulating a nutrient solution between a supply vessel and one chamber of a remote dialyzer and circulating a culture of microorganisms between a second chamber of said dialyzer and a remote fermentor, so that the amount of nutrient from said solution diffused into the culture is greater than the amount of nutrient normally assimilable by said culture, whereby increased concentration of microorganisms is obtained.

5. Process of conducting a fermentation with microorganisms that comprises circulating an aqueous solution between a supply vessel and one chamber of a remote dialyzer, circulating a culture of microorganisms between a second chamber of said dialyzer and a remote fermentor, and aerating said aqueous solution whereby said culture is indirectly aerated.

6. A flask for use in dialysis fermentation that comprises an enclosed fluid container, a plurality of semi-permeable membranes each having a different pore diameter, disposed across said container and separating said container into at least three chambers, inlet and outlet means provided in each of said chambers and means disposed about the periphery of said container for securing said membrane thereto, and foraminous support plates disposed on opposite sides of said membranes in a substantially parallel plane thereto for support thereof.

7. A flask for use in dialysis fermentation with microorganisms that comprises three chambers; each of said chambers having inlet and outlet means, and means for securing said chambers to each other to provide an enclosed container; the chambers of said container being separated from one another in the enclosed state by semi-permeable membranes, each of said semi-permeable membranes having a different pore size, foraminous plates mounted on opposite sides of said semi-permeable membranes in spaced, supporting, and substantially parallel relation thereto; an opening defined in each of said chambers, and closure means therefor.

8. A flask for conducting fermentation with microorganisms that comprises three chambers, each of said chambers having inlet and outlet means, and means for securing said chambers to each other to provide an enclosed container having a lower, middle, and upper chamber; an ultra-filter separating said upper and middle chambers, and a membrane separating said lower and middle chambers; foraminous plates mounted on opposite sides of each of said membrane and said ultra-filter in spaced, supporting, and parallel relation thereto, and extending across the width of said container; an opening defined in each of said chambers, and closure means therefor.

(References on following page)

References Cited by the Examiner

UNITED STATES PATENTS

| | | | |
|---|---|---|---|
| 2,879,207 | 3/59 | Poitras | 195—39 |
| 3,000,706 | 9/61 | Royce | 23—232 |
| 3,018,224 | 1/62 | Ferrari | 195—103.5 |
| 3,092,465 | 6/63 | Adams | 23—253 |

OTHER REFERENCES

Porter: Bacterial Chemistry and Physiology, John Wiley and Sons, Inc., New York, 1946, pages 8–10. QR 84P75.

A. LOUIS MONACELL, *Primary Examiner.*

A. H. WINKELSTEIN, *Examiner.*